United States Patent [19]

LeVert et al.

[11] 4,259,575

[45] Mar. 31, 1981

[54] DIRECTIONAL GAMMA DETECTOR

[75] Inventors: Francis E. LeVert, Knoxville, Tenn.; Samson A. Cox, Downers Grove, IL

[73] Assignee: The United States of America as represented by the Department of Energy, Washington, D.C.

[21] Appl. No.: 137,095

[22] Filed: Apr. 4, 1980

[51] Int. Cl.³ .............................. G01J 1/00; G01T 1/22
[52] U.S. Cl. ...................................... 250/336; 250/370
[58] Field of Search .............. 250/336, 370, 371, 390, 250/394

[56] References Cited

U.S. PATENT DOCUMENTS

| 3,400,289 | 9/1968 | Anderson | 250/390 |
|---|---|---|---|
| 3,603,793 | 9/1971 | Warren | 250/392 |
| 3,940,627 | 2/1976 | Klar | 250/390 |
| 4,091,288 | 5/1978 | LeVert et al. | 250/370 |
| 4,136,282 | 1/1979 | Cox et al. | 250/336 |

*Primary Examiner*—Alfred E. Smith
*Assistant Examiner*—Janice A. Howell
*Attorney, Agent, or Firm*—Paul A. Gottlieb; Bruce R. Mansfield; Richard G. Besha

[57] ABSTRACT

An improved directional gamma radiation detector has a collector sandwiched between two layers of insulation of varying thicknesses. The collector and insulation layers are contained within an evacuated casing, or emitter, which releases electrons upon exposure to gamma radiation. Delayed electrons and electrons entering the collector at oblique angles are attenuated as they pass through the insulation layers on route to the collector.

10 Claims, 3 Drawing Figures

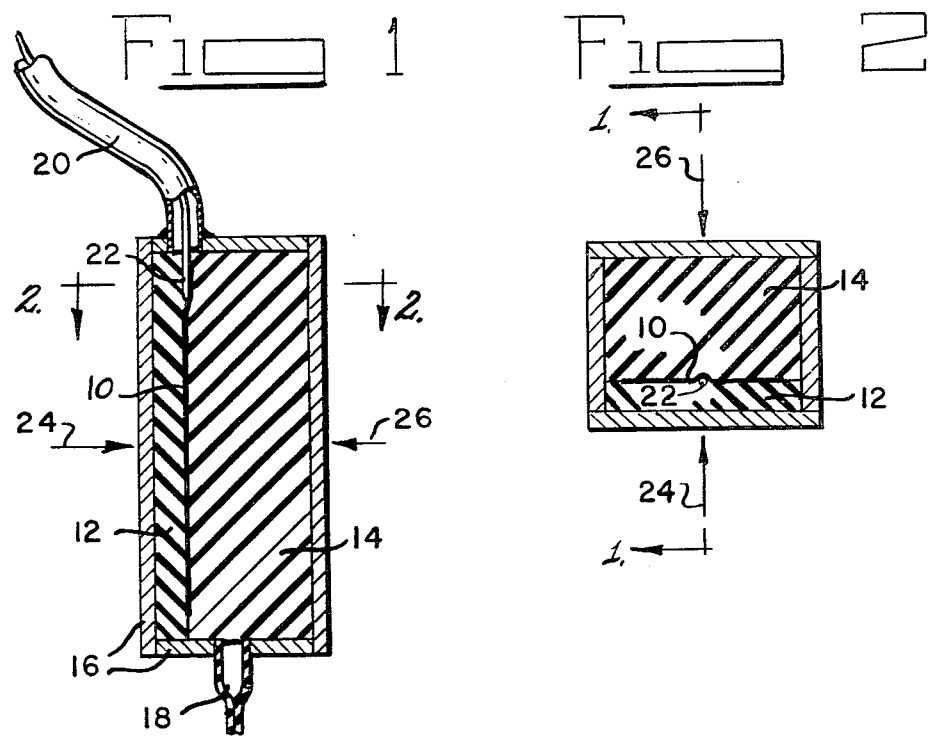
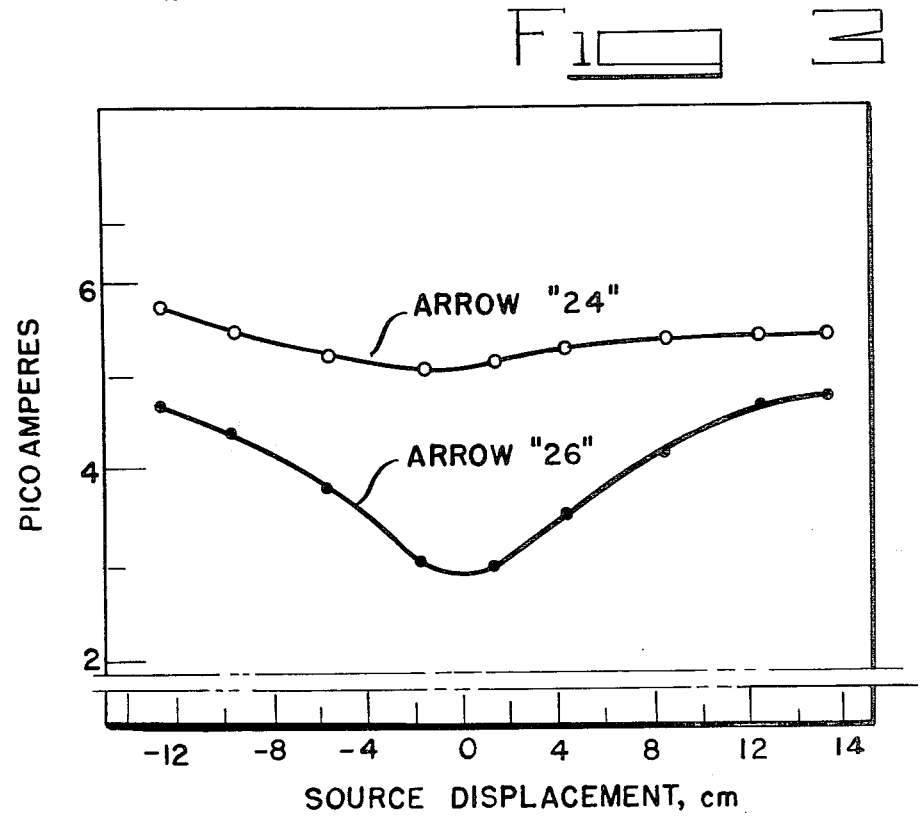

DIRECTIONAL GAMMA DETECTOR

CONTRACTUAL ORIGIN OF THE INVENTION

The invention described herein was made in the course of, or under, a contract with the U.S. DEPARTMENT OF ENERGY.

BACKGROUND OF THE INVENTION

This invention relates to the detection of gamma radiation. In particular, this invention is an improvement on the directional detector of gamma rays that was the subject of U.S. Pat. No. 4,136,282.

One of the many sources of information that is of use in controlling nuclear reactors is the flux of gamma rays at various locations in the core of the reactor. It is useful to have information about the direction of incidence of gamma rays, of the density of the flux, and of the energies or energy ranges of the gamma rays. While the reactor is operating, the item of maximum interest in controlling the reactor reactor is the power level of operation. It is also true that useful information that is not necessarily related directly to the power level of the reactor can be obtained from information about the flux of gamma rays incident on a particular localized region in the core of the reactor. While most of the localized core monitors have measured properties of neutron fluxes, a small number of sensors deals either directly or incidentally with a flux of gamma rays. These include the following U.S. Patents that are believed to be the most pertinent to the present invention: Nos. 3,603,793; 3,400,289; and 4,091,288, as well as U.S. Pat. No. 4,136,282, of which the present invention is an improvement.

U.S. Pat. No. 3,603,793, entitled "Radiation Detector Solid State Radiation Detector Using an Insulator Between the Emitter and Collector" was issued in 1971 to Warren. While that detector is principally a neutron detector, it does refer to the possibility of generating electrons by an undisclosed process when gamma rays are incident upon an emitter of ytterbium. The emitter of the '793 patent is surrounded by a coaxial insulator that discriminates on an energy basis between prompt electrons and delayed electrons. While the '793 patent refers to gamma rays as a possible cause of electron emission, it appears from the disclosure in that patent that the principal object of that invention is to detect neutrons, with the detection of gamma rays appearing to be almost incidental to the operation of the device.

U.S. Pat. No. 4,091,288, entitled 'Threshold Self-Gamma Detector for Use as a Monitor of High Power in a Nuclear Reactor" was issued in 1978 to LeVert and Cox. It is a lead prism surrounded by a coaxial thin nickel sheet to form a collector. A coaxial polyethelene electron barrier encloses the collector and is separated from the nickel sheet by a vacuum region. The electron barrier is enclosed by a coaxial stainless steel emitter which in turn is enclosed within a lead casing. When the detector is placed in a flux of gamma rays, a measure of the current flow in an external circuit between emitter and collector provides a measure of the power level of the reactor. It should be noted that this detector is isotropic cylindrically in view of the generally cylindrical symmetry that is exhibited in its design.

The U.S. Pat. Nos. 3,400,289 issued in 1968 to Anderson, and 3,940,627 issued in 1976 to Klar, are mentioned here because they were cited in the prosecution of U.S. Pat. No. 4,091,288. They are not believed to be pertinent to the present invention.

Of the patents cited above, only U.S. Pat. No. 4,136,282 provides information about the direction of gamma rays. All the other patents cited describe detectors that are at least cylindrically isotropic and some of those patents are directed to detectors that function primarily to detect neutrons. The '282 patent is directed to an apparatus that has a strip of an electrical conductor of high atomic number backed with a strip of a second electrical conductor of low atomic number. These elements are enclosed within and insulated from an electrical conductor that establishes an electrical ground, maintains a vacuum enclosure, and screens out lowenergy gamma rays.

Most of the detectors that have been used for directional detection of gamma rays, except for the detector of the '282 patent, use collimators of extensive length or elongated detectors that also extend for some distance in the direction of detection or normal to it. Such long detectors or collimators usually require so much space that they are not installed in the cores of nuclear reactors but are instead placed in an external flux. Such long detectors or collimators are also not readily changed in position to change the direction of radiation that they sense. It is desirable to overcome these drawbacks by providing a detector which can be readily placed in or near the core of a nuclear reactor and is small enough that its direction of detection can be readily changed with minimal or no disturbance to the structure of a reactor. Detectors of this type are useful when it is necessary to monitor the performance of a nuclear reactor by obtaining information only about gamma rays that are in a specific energy range and in a specific direction.

It is therefore an object of the present invention to provide an improved directional detector of gamma rays.

It is a further object of the present invention to provide a self-powered directional detector of gamma rays that are in a predetermined energy range.

Other objects will be apparent in the course of a detailed description of the invention.

SUMMARY OF THE INVENTION

A directional detector of gamma rays in predetermined energy ranges comprises a metal-foil collector that is sandwiched between two insulators of differing thickness. The sandwich in turn is encased in a metal enclosure that is evacuated. The metal enclosure acts as an emitter of electrons which are generated by gamma rays. The collector is insulated from the metal enclosure and an electrical connection is brought through the evacuated metal enclosure from the collector by a feedthrough. When this apparatus is placed in a flux of gamma rays a measure of current flow in an external circuit between the collector and the case provides a measure of the energy and direction of the flux of gamma rays. Variation of the thicknesses of the insulators in the sandwich allows the selection of a range of energies of gamma rays that are measured.

BRIEF DESCRIPTION OF THE DRAWINGS

FIG. 1 is a sectional side view of an apparatus for the practice of the present invention.

FIG. 2 is a sectional top view of the apparatus of FIG. 1 taken along section lines 2—2.

FIG. 3 is a plot of the response of the apparatus of FIGS. 1 and 2 as a function of source displacement for two orientations of the detector.

DETAILED DESCRIPTION OF THE INVENTION

FIG. 1 is a sectional side view of the apparatus for the practice of the present invention and FIG. 2 is a sectional top view of the apparatus of FIG. 1 taken along section lines 2—2. In FIGS. 1 and 2 collector 10 is a thin metallic foil that is sandwiched between a first insulator 12 and a second insulator 14. Second insulator 14 is three to six times as thick as first insulator 12, and preferably four times as thick, a fact that will be seen later to contribute to the directional properties of the sensor. The sandwich structure that is formed by collector 10 and first and second insulators 12 and 14 is placed within a metal case 16 that is sealed so that it can be evacuated. Case 16 is evacuated through pumpout line 18 which is pinched to hold a seal. Collector 10 is maintained between first and second insulators 12 and 14 in such a way that collector 10 does not make electrical contact with case 16. Electrical contact with collector 10 is made through coaxial cable 20 which is connected through feedthrough 22 to collector 10. Feedthrough 22 maintains the vacuum while permitting an external connection to collector 10. The outer conductor of coaxial cable 20 is connected electrically to case 16. The other end of coaxial cable 20 is connected to a current measuring device such as a microammeter or the like.

Operation of the apparatus of FIGS. 1 and 2 will now be described in terms of the arrows 24 and 26 that describe two directions of incidence of gamma rays on the apparatus. Gamma rays that are incident from either of these directions will generate photoelectrons and Compton electrons when they strike case 16. It is desirable to make case 16 of a material that emits Compton electrons and photoelectrons in response to the incidence of gamma rays. Insulators 12 and 14 are made of a material such as beryllia or the like that can both withstand the radiation in the core of a nuclear reactor and also serve as a generator of photoelectrons and Compton electrons in response to gamma rays that penetrate case 16. Collector 10, on the other hand, is made of a material such as nickel that is relatively transparent to gamma rays. Collector 10 is made of a foil that is relatively thin so as to reduce further the emission of photoelectrons and Compton electrons from gamma rays that strike collector 10.

In the apparatus of FIGS. 1 and 2, the principal source of electrons in response to the incidence of gamma rays is the case 16, and the principal function of insulators 12 and 14 is to screen out the lower-energy electrons produced in response to the incidence of lower-energy gamma rays. In this connection, the relative thicknesses of first and second insulators 12 and 14 combined with the absolute thicknesses of these insulators provides a means both of screening out lower-energy electrons and of providing a directional preference to the apparatus. In particular, gamma rays incident in the direction of arrow 24, produce electrons that travel in substantially the same direction as arrow 24. These electrons approach collector 10 through the thinner first insulator 12 and are attenuated by a smaller thickness of insulation than electrons incident in the direction of second arrow 26. The latter electrons pass through a greater thickness of second insulator 14. The result is to produce a directional sensitivity for radiation in the direction of arrow 24 that is greater than that for radiation incident in the direction of arrow 26. In addition, electrons approaching planar collector 10 at oblique angles increasingly diverging from an orthoganal direction to that plane, must traverse longer paths through insulators 12, 14 and accordingly undergo greater attenuation, thereby producing less current.

The effects of direction and angular position on the signal generated by a constant flux of gamma rays is shown in FIG. 3 which is a plot of electric current as a function of source displacement for two orientations of the detector of FIGS. 1 and 2. The two orientations are associated respectively with arrows 24 and 26 of FIG. 2 and the source is displaced along a line that is perpendicular to arrows 24 and 26. Inspection of FIG. 3 shows that, when the source is displaced on the side of arrow 26, the current varies from a minimum of 3 picoamperes (in the zero-displacement position) to a maximum value of approximately 4.8 picoamperes. Similarly, differences in current are detectable to provide a measure of the angle of incidence of gamma rays on the detector.

A detector has been built to practice the principles of the present invention at the Argonne National Laboratory. In that detector, collector 10 was nickel foil, approximately $\frac{1}{2}$ mil in thickness. First and second insulators 12 and 14 were both made of beryllia. First insulator 12 was approximately 1 inch square and 0.05 inches thick. Second insulator 14 was also approximately 1 inch square and 0.20 inches in thickness. Case 16, made of stainless steel 5/16 inch in thickness, is the principal emitter of photoelectrons and Compton electrons that are to be collected by collector 10. The operative concerns in the selection of materials for the detector were first, that collector 10 be a conductor of electricity and second, that it produce few photoelectrons or Compton electrons as a result of the incidence of gamma rays. This is accomplished by making collector 10 of a very thin metal foil and also by making it of a material such as nickel which produces a relatively small number of Compton electrons and photo-electrons in response to incident gamma radiation. In addition to providing vacuum containment, case 16 must be chosen to generate a desired number of photo-electrons or Compton electrons in response to gamma rays in a desired energy range. While the case 16 of the apparatus used to obtain the curves of FIG. 3 was made of 316 stainless steel, Inconel or other alloys with appropriate cross sections might equally as well be chosen.

The beryllia used in first and second insulators 12 and 14 spaces the collector 10 from case 16, thereby insulating it electrically, and also offers selective resistance or attenuation of lower-energy electrons, so as to limit the electrons collected to those in a desired range that is associated with a desired range of energy of gamma rays. While in the preferred embodiment, the ratio of the thickness of insulator 14 to the thickness of insulator 12 was four, ratios ranging between three and six are also contemplated in the practice of this invention. However, the thinner insulation must have enough resistance to discriminate against lower energy electrons travelling therethrough. For this reason insulator 12 was not made thinner than 0.020 inches. Although insulators 12, 14 are made of beryllia, any suitable material may be used, although when the material of both insulators 12, 14 is the same, insulator 14 must be substantially thicker than insulator 12, thereby providing a greater resistance or attenuation of lower energy electrons passing therethrough. However, insulators 12, 14 need not be formed of the same material, as long as insulator 14 provides a greater resistance to lower energy electron flow than insulator 12. In any event, the ratio of the resistances of insulator 14 to insulator 12 must be greater than unity, and must be sufficiently great so as to allow the current measuring device connected to coaxial cable 20 to detect a difference in signal strength between signals flowing in the direction of arrows 24, 26, respectively.

The embodiments of the invention in which an exclusive property or privilege is claimed are defined as follows:

1. A directional detector of gamma rays comprising:
    an electrically conductive collector having first and second surfaces;
    at least one emitter which emits electrons upon exposure to gamma rays;
    a first insulator of predetermined resistance disposed between said first surface of said collector and said emitter;
    a second insulator disposed between said second surface of said collector and said emitter, said second insulator having a resistance greater than the resistance of said first insulator;
    means for completing an electrical circuit between said emitter and said collector; and
    means for measuring the electric current in the circuit.

2. The apparatus of claim 1 wherein said collector includes confronting surfaces which contact said first and said second insulators, respectively.

3. The apparatus of claim 2 wherein said confronting surfaces of said collector are planar.

4. The apparatus of claim 1 wherein said first and said second insulators are formed of a homogeneous dielectric material.

5. The apparatus of claim 4 wherein said first insulator has a predetermined substantially uniform thickness and said second insulator has a substantially uniform thickness greater than the thickness of said first insulator.

6. The apparatus of claim 5 wherein said dielectric material is beryllia.

7. The apparatus of claim 6 wherein the thickness of said second insulator is in the range of three to six time the thickness of said first insulator.

8. The apparatus of claim 1 wherein said collector comprises nickel foil.

9. The apparatus of claim 1 wherein said emitter is a vacuum enclosure encasing said collector and said first and said second insulators.

10. The apparatus of claim 1 wherein:
    said collector comprises a sheet of nickel foil approximately 0.5 mil thick;
    said emitter is formed of stainless steel approximately 5/16 of an inch in thickness;
    said first insulator includes a sheet of beryllia approximately 0.05 inches thick; and
    said second insulator includes a sheet of beryllia approximately 0.2 inches in thickness.

* * * * *